United States Patent [19]

Jones et al.

[11] Patent Number: 5,391,701
[45] Date of Patent: Feb. 21, 1995

[54] POLY(ETHYLENE 2,6-NAPHTHALENE DICARBOXYLATE)/HALOGEN COMPOUND COMPOSITIONS HAVING REDUCED FLUORESCENCE

[75] Inventors: Allan S. Jones, Church Hill; David E. Mills, Kingsport, both of Tenn.; Mitchell A. Winnik, Toronto, Canada

[73] Assignee: Eastman Chemical Company, Kingsport, Tenn.

[21] Appl. No.: 103,643

[22] Filed: Aug. 9, 1993

[51] Int. Cl.⁶ ............................................. C08G 63/189
[52] U.S. Cl. ................................... 528/298; 528/272; 528/299; 528/302; 528/305; 528/308
[58] Field of Search ............... 528/272, 298, 299, 302, 528/305, 308

[56] References Cited

U.S. PATENT DOCUMENTS

| | | | |
|---|---|---|---|
| 4,045,513 | 8/1977 | Knopka | 524/399 |
| 4,059,546 | 11/1977 | Knopka | 524/34 |
| 4,101,528 | 7/1978 | Knopka | 524/409 |

OTHER PUBLICATIONS

CA116(6):42677v
CA86(24):172389a
CA84(6):32474h
CA83(20):165176p
CA83(12):98441f
CA83(16):132696e
Chen Shangxian et al., "Fluorescence Spectra of Poly(Ethylene-2,6-Naphthalene Dicarboxylate)", *Scientia Sinica*, vol. XXIV, No. 5, May 1981.
CAO Ti et al., "Intermolecular Excimer Interaction in Poly(Polytetramethylene Ether Glycol Aryl Dicarboxylate", *Acta Chimica Sinica*, vol. 42. No.1, 1984.

*Primary Examiner*—Samuel A. Acquah
*Attorney, Agent, or Firm*—John D. Thallemer

[57] ABSTRACT

This invention relates to a poly(ethylene 2,6-naphthalene dicarboxylate) composition having reduced fluorescence. More specifically, the composition contains poly(ethylene 2,6-naphthalene dicarboxylate) with 0.1 to 5 mole percent of a copolymerizable halogen containing aromatic compound. The polyesters are useful for packaging applications where clarity and/or aesthetic appeal are of concern.

13 Claims, No Drawings

POLY(ETHYLENE 2,6-NAPHTHALENE DICARBOXYLATE)/HALOGEN COMPOUND COMPOSITIONS HAVING REDUCED FLUORESCENCE

FIELD OF THE INVENTION

This invention relates to a poly(ethylene 2,6-naphthalene dicarboxylate) composition having reduced fluorescence. More specifically, the composition contains poly(ethylene 2,6-naphthalene dicarboxylate) with 0.1 to 5 mole percent of a copolymerizable halogen containing aromatic compound. The polyesters are useful for packaging applications where clarity and/or aesthetic appeal are of concern.

BACKGROUND OF THE INVENTION

Poly(ethylene-2,6-naphthalene dicarboxylate), referred to as PEN, is widely used as an extrusion and injection-molding resin because of its good heat resistance, high glass transition temperature, and gas barrier properties. PEN is used in the fabrication of various articles for household or industrial use, including appliance parts, containers, and auto parts. One major drawback of PEN, however, is its inherent bluish fluorescence. Thus, objects prepared with PEN have a hazy and bluish appearance. This phenomenon is especially of concern in the packaging of foods and beverages wherein the food or beverage inside the PEN container appears unnatural.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$ second). Fluorescence in a polymer or small molecule, occurs when a photon is emitted from an excited singlet state. Quenching of fluorescence eliminates or reduces the ability for photon emission by providing an alternative pathway for the excited state energy such as vibronic or heat loss, or intersystem crossing to the excited triplet state.

Methods to quench fluorescence in PEN have been disclosed by Chen Shangxian et al. in an article entitled, "Fluorescence Spectra of Poly(Ethylene-2,6-Naphthalene Dicarboxylate)" which appeared in *SCIENTIA SINICA*, Vol. XXIV, No. 5, May 1981, and by CAO Ti et al. in an article entitled, "Intermolecular Excimer Interaction In Poly(Polytetramethylene Ether Glycol Aryl Dicarboxylate)" which appeared in *ACTA CHIMICA SINICA*, Vol. 42, No. 1, 1984. Both of the references disclose the use of o-chlorophenol to quench PEN fluorescence in a chloroform solution. Dissolving the PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

In contrast, the present inventors have unexpectedly determined that the incorporation of 0.1 to 5 mole percent of a copolymerizable halogen containing aromatic compound in PEN significantly reduces fluorescence without deleteriously effecting the physical properties of the polyester.

SUMMARY OF THE INVENTION

Accordingly, it is one object of the present invention to provide PEN compositions with reduced fluorescence.

Accordingly, it is another object of the invention to provide PEN compositions which have reduced fluorescence and are useful in applications where good heat resistance, high glass transition temperature and gas barrier properties are required. These and other objects are accomplished herein by a poly(ethylene 2,6-naphthalene dicarboxylate) composition with reduced fluorescence comprising repeat units from:

(a) a dicarboxylic acid component which comprises at least 85 mole percent of a dicarboxylic acid selected from the group consisting of naphthalene-2,6-dicarboxylic acid, and naphthalene-2,6-dicarboxylate ester;

(b) a diol component which comprises at least 85 mole percent of ethylene glycol; and (c) 0.1 to 5 mole percent, based on 100 mole percent dicarboxylic acid and 100 mole percent diol, of a copolymerizable halogen containing aromatic compound which has at least one halogen atom directly attached to the aromatic ring.

DESCRIPTION OF THE INVENTION

The polyester of the present invention is poly(ethylene 2,6-naphthalene dicarboxylate) with a fluorescence quenching compound. The poly(ethylene 2,6-naphthalene dicarboxylate) polymer contains repeat units from a dicarboxylic acid, a diol and a copolymerizable halogen containing aromatic compound. The dicarboxylic acid, component (a), consists of at least 85 mole percent naphthalene-2,6-dicarboxylic acid or naphthalene-2,6-dicarboxylate ester. The diol, component (b), consists of at least 85 mole percent ethylene glycol. The copolymerizable halogen containing aromatic compound, component (c), consists of 0.1 to 5 mole percent, based on 100 mole percent dicarboxylic acid and 100 mole percent diol, of a copolymerizable halogen containing aromatic diacid, diester or diol. Preferably, the polyester contains repeat units from at least 90 mole percent naphthalene-2,6-dicarboxylic acid or naphthalene-2,6-dicarboxylate ester, and at least 90 mole percent ethylene glycol. More preferably, the polyester contains at least 95 mole percent naphthalene-2,6-dicarboxylic acid or naphthalene-2,6-dicarboxylate ester, and at least 95 mole percent ethylene glycol.

The dicarboxylic acid component of the polyester may optionally be modified with up to 15 mole percent of one or more different dicarboxylic acids other than naphthalene-2,6-dicarboxylic acid or naphthalene-2,6-dicarboxylate ester. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with naphthalene-2,6-dicarboxylic acid or naphthalene-2,6-dicarboxylate ester are: terephthalic acid, phthalic acid, isophthalic acid, cyclohexanediacetic acid, diphenyl-4,4'-dicarboxylic acid, succinic acid, glutaric acid, adipic acid, fumaric acid, azelaic acid, sebacic acid, 2,7-naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, and the like. It should be understood that use of the corresponding acid anhydrides, esters, and acid chlorides of these acids is included in the term "dicarboxylic acid". The polyester may be prepared from one or more of the above dicarboxylic acids or esters.

In addition, the polyester may optionally be modified with up to 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The polyester may be prepared from one or more of the above diols.

The polyester may also contain small amounts of trifunctional or tetrafunctional comonomers such as trimellitic anhydride, trimethylolpropane, pyromellitic dianhydride, pentaerythritol, and other polyester forming polyacids or diols generally known in the art.

Component (c) of the present invention is 0.1 to 5 mole percent, preferably 0.5 to 2 mole percent of a fluorescence quenching compound. Using more than 5 mole percent of the fluorescence quenching compound hinders the crystallization of the polyester and results in inferior physical properties. The fluorescence quenching compound is a copolymerized halogen containing aromatic compound which is copolymerized in the poly(ethylene-2,6-naphthalene dicarboxylate) backbone. The copolymerized halogen containing aromatic compound contains an aromatic ring selected from benzene, naphthalene and biphenyl.

At least two polymerizable groups are attached to the aromatic ring. Preferably, two polymerizable groups are attached to the aromatic ring. The polymerizable groups are carboxylic esters and/or aliphatic hydroxyl groups. The carboxylic ester has the formula:

wherein $R_3$ is independently a $C_1$ to $C_6$ alkyl or phenyl group, preferably methyl. The aliphatic hydroxyl group has the formula:

wherein n is an integer from 1 to 6, preferably n is 2. Preferred aromatic ring compounds containing polymerizable groups are terephthalic acid, isophthalic acid, and 2,6-naphthalenedicarboxylic acid. The most preferred is 2,6-naphthalenedicarboxylic acid.

In addition to the polymerizable groups, the aromatic ring contains at least one halogen atom selected from bromine, chlorine, iodine or combinations thereof but not chlorine alone. The halogen atoms can be attached to any of the unsubstituted positions on the aromatic rings. Preferred copolymerizable halogen containing aromatic compounds include dimethyl iodoterephthalate (iodo terephthalic acid), dimethyl 4-bromo-2,6-naphthalenedicarboxylate, (4-bromo-2,6-naphthalenedicarboxylic acid), dimethyl 1-bromo 2,6-naphthalenedicarboxylate, dimethyl 3-bromo 2,6-naphthalenedicarboxylate, dimethyl 1-iodo 2,6-naphthalenedicarboxylate, dimethyl 3-iodo 2,6-naphthalenedicarboxylate, dimethyl 4-iodo 2,6-naphthalenedicarboxylate, dimethyl 2,3-dibromoterephthalate, dimethyl 2,5-dibromoterephthalate, dimethyl tribromoterephthalate, dimethyl tetrabromoterephthalate, dimethyl 2-bromo-5-chloroterephthalate, dimethyl 2-bromo-6-chloroterephthalate, dimethyl 2-bromo-5-iodoterephthalate, dimethyl 2-bromo-6-iodoterephthalate, dimethyl 2-benzoyl-5-bromoterephthalate, dimethyl 2-benzoyl-6-bromoterephthalate, dimethyl 2-benzoyl-5-iodoterephthalate, and dimethyl 2-benzoyl-6-iodoterephthalate.

Many other ingredients can be added to the compositions of the present invention to enhance the performance properties of the polyester. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention from accomplishing its objects.

The poly(ethylene-2,6-naphthalene dicarboxylate) polymer with the fluorescence quenching compound is prepared by conventional polycondensation procedures well-known in the art which generally include a combination of melt phase and solid state polymerization. Melt phase describes the molten state of PEN during the initial polymerization process. The initial polymerization process includes direct condensation of the naphthalene-2,6-dicarboxylic acid with ethylene glycol or by ester interchange using naphthalene-2,6-dicarboxylic ester. For example, dimethyl-2,6-naphthalenedicarboxylate is ester interchanged with ethylene glycol at elevated temperatures in the presence of the copolymerizable halogen containing compound and a catalyst. The melt phase is concluded by extruding the PEN polymer into strands and pelletizing. Optionally, the copolymerizable halogen containing compound can be melt blended with the poly(ethylene-2,6-naphthalene dicarboxylate).

The poly(ethylene-2,6-naphthalene dicarboxylate) with the fluorescence quenching compound may optionally be solid state polymerized. Solid state polymerization involves heating the polymer pellets to a temperature in excess of 200° C., but well below the crystalline melt point, either in the presence of an inert gas stream or in a vacuum to remove a diol. Several hours are generally required in the solid state polymerization unit to build the molecular weight.

Typical catalysts which may be used include titanium alkoxides, dibutyl tin dilaurate, combinations of zinc, manganese, or magnesium acetates or benzoates with antimony oxide or antimony triacetate.

The poly(ethylene-2,6-naphthalene dicarboxylate) polymers of the present invention have a melting point (Tm) of about 263° C.±10° C. and a glass transition temperature (Tg) of about 125° C.±5° C. The inherent viscosity of the polyester should be 0.3 to 1.5 dL/g. However, inherent viscosities of from 0.5 to 0.9 are preferred, as measured at 25° C. using 0.50 grams of polymer per 100 ml of a solvent consisting of 60% by weight phenol and 40% by weight tetrachloroethane.

The poly(ethylene-2,6-naphthalene dicarboxylate) compositions serve as excellent starting materials for the production of moldings of all types. Specific applications include food packaging such as bottles, trays, lids and films, medical parts, appliance parts, automotive parts, tool housings, recreational and utility parts. The molding compositions of the present invention are especially useful in applications that require transparent molded parts. Additionally, the polyesters can be used to prepare extruded sheets for thermoforming applications. The polyesters are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) co-injection or coextrusion where the polyesters can serve as either the structural layer or barrier layer depending upon end use requirements. Fibers, melt-blown webs, extruded sheets, vacuum-drawn trays/parts, Injection molded parts, and extrusion coated wires may also be made from these polyesters.

The materials and testing procedures used for the results shown herein are as follows:

Fluorescence Intensity was determined using a Perkin-Elmer LS5B Luminescence Spectrometer which measured relative fluorescence intensity at peak maxima.

The composition of the polyesters was determined using H-NMR spectroscopy (JEOL 270 Mhz). Solutions (2.5% weight/volume) in 70/30 $CDCl_3/CF_3COOD$ were scanned 256 times. A delay of 10 seconds was used with a pulse width of 3.4 microseconds (5.0 microseconds, 90°).

Crystallization half-times ($t_{\frac{1}{2}}$) were determined by differential scanning calorimetry (DSC) using a Perkin-Elmer DSC II instrument. The $t_{\frac{1}{2}}$ was determined by the following method: The sample was heated to 300° C. under a nitrogen atmosphere and held for two minutes. The sample was removed from the DSC and immediately cooled to −20° C. The DSC was cooled to 50° C. and the sample was returned to the DSC. The temperature of the DSC was increased at a rate of 320° C./minute to a test temperature of 190° C., 210° C. or 230° C. Samples were isothermally crystallized at each of the test temperatures. The crystallization half-time ($t_{\frac{1}{2}}$) is the time required to reach the peak on the crystallization exotherm.

Inherent viscosity (I.V.) was measured at 25° C. using 0.50 grams of polymer per 100 ml of a solvent consisting of 60% by weight phenol and 40% by weight tetrachloroethane.

Sample preparation for determining fluorescence intensity involved grinding the polyester samples to 3–4 mm. The samples were micropulverized in an analytical grinding mill and passed through a 120 mesh screen. The powders were dried for 24 hours at 140° C. Approximately 0.5 grams of the powder was packed into a sample holder and measurements were taken by reflectance. The excitation wavelength was 350 nm and the emission maxima was 428–432 nm for all of the samples. The values are reported as normalized to PEN (fluorescence intensity 100). The fluorescence intensity of PEN was repeated 10 times with a standard deviation of 5.0. Two measurements were taken of all other samples and the averages are reported in Table I.

The present invention will be further illustrated by a consideration of the following examples, which are intended to be exemplary of the invention. All parts and percentages in the examples are on a weight basis unless otherwise stated.

EXAMPLE 1

Poly(ethylene 2,6-naphthalene dicarboxylate) was prepared by the following procedure.

Dimethyl 2,6-naphthalene dicarboxylate (0.5 moles, 122 grams), ethylene glycol (1.0 moles, 62 grams), and catalyst metals were placed in a 500 mL polymerization reactor under a nitrogen atmosphere. The mixture was heated with stirring at 200° C. for 2 hours. The temperature was increased to 220° C. and maintained for 1 hour. The temperature was increased to 290° C. which took approximately 20 minutes. When the temperature reached 290° C., the nitrogen flow was stopped and vacuum was applied. The polymer was stirred under vacuum (0.1–0.3 mm Hg) for 50 minutes. The polymer was cooled and ground. The fluorescence intensity and I.V. of the polymer are summarized in Table I, and $t_{\frac{1}{2}}$ are listed in Table II.

EXAMPLE 2

Poly(ethylene 2,6-naphthalene dicarboxylate) with 1.0 mole percent copolymerized dimethyl 4-bromo-2,6-naphthalene dicarboxylate was prepared by the following procedure.

Dimethyl 2,6-naphthalene dicarboxylate (0.49 moles, 119.56 grams), dimethyl 4-bromo-2,6-naphthalene dicarboxylate (0.0050 moles, 1.62 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 3

Poly(ethylene 2,6-naphthalene dicarboxylate) with 1.0 mole percent copolymerized dimethyl iodoterephthalate was prepared by the following procedure.

Dimethyl 2,6-naphthalene dicarboxylate (0.495 moles, 120.78 grams), dimethyl iodoterephthalate (0.0053 moles, 1.70 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 4

Poly(ethylene 2,6-naphthalene dicarboxylate) with 2.0 mole percent of copolymerized dimethyl iodoterephthalate was prepared by the following procedure.

Dimethyl 2,6-naphthalene dicarboxylate (0.49 moles, 119.56 grams), dimethyl iodoterephthalate (0.010 moles, 3.2 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 5

Poly(ethylene 2,6-naphthalene dicarboxylate) with 4.0 mole percent copolymerized dimethyl iodoterephthalate was prepared by the following procedure.

Dimethyl 2,6-naphthalene dicarboxylate (0.48 moles, 117.12 grams), dimethyl iodoterephthalate (0.0196 moles, 6.26 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

TABLE I

| EXAMPLE | HALOGEN COMPOUND (mole %) | I.V. (dL/g) | FLUORESCENCE INTENSITY (at 430 nm) |
|---|---|---|---|
| 1 | PEN control | 0.42 | 100 |
| 2 | PEN + 1.0% 4-bromo-DMN[1] | 0.47 | 58 |
| 3 | PEN + 1.0% iodo-DMT[2] | 0.49 | 73 |
| 4 | PEN + 2.0% iodo-DMT[2] | 0.35 | 58 |
| 5 | PEN + 4.0% iodo-DMT[2] | 0.28 | 41 |

[1]dimethyl 4-bromo-2,6-naphthalene dicarboxylate
[2]dimethyl iodoterephthalate

The results in Table I indicate that the poly(ethylene-2,6-naphthalene dicarboxylate) compositions containing a critical range of a copolymerizable halogen containing compound as a fluorescence quencher, which is copolymerized in the PEN backbone, exhibit significantly less fluorescence than PEN compositions without the fluorescence quencher. In addition, the data in Table I also indicates that the use of the fluorescence quencher in a critical amount does not deleteriously effect the inherent viscosity of the polyester.

TABLE II

| EXAMPLE | HALOGEN COMPOUND (mole %) | $t_{\frac{1}{2}}$ (minutes) | | |
|---|---|---|---|---|
| | | 190° C. | 210° C. | 230° C. |
| 1 | PEN control | 2.5 | 1.5 | 2.5 |
| 2 | PEN + 1.0% 4-bromo-DMN[1] | 4.6 | 3.1 | 6.1 |
| 3 | PEN + 1.0% iodo-DMT[2] | 2.5 | 1.7 | 3.1 |
| 4 | PEN + 2.0% iodo-DMT[2] | 2.5 | 1.7 | 3.6 |
| 5 | PEN + 4.0% iodo-DMT[2] | 3.9 | 2.8 | 7.2 |

[1]dimethyl 4-bromo-2,6-naphthalene dicarboxylate
[2]dimethyl iodoterephthalate

The results in Table II establish the critical range for the copolymerizable halogen containing aromatic compounds as fluorescence quenchers which are copolymerized in the poly(ethylene-2,6-naphthalene dicarboxylate) backbone. The data indicates that 0.1 to 5 mole percent of the copolymerizable halogen containing aromatic compounds reduce fluorescence without deleteriously effecting the physical properties of the polyester. In contrast, greater than 5 mole percent of the copolymerizable halogen containing aromatic compounds in the compositions slows down the crystallization rate to an unacceptable level.

EXAMPLE 6

Dimethyl 4-bromo-2,6-naphthalene dicarboxylate was prepared by the following procedure.

Dimethyl-2,6-naphthalene dicarboxylate (35 grams, 0.14 moles), mercuric oxide (62 grams, 0.29 moles), carbon tetrachloride (1050 mL), and methylene chloride (700 mL) were placed in a three liter flask fitted with a mechanical stirrer, continuous addition funnel, and reflux condenser. After reflux was achieved, bromine (45.7 grams, 0.029 moles) was added dropwise followed by dropwise addition of concentrated sulfuric acid (28 mL). After 5 hours, the reaction mixture was filtered hot and the solid material was extracted five times with methylene chloride. Extracts were combined with the filtrate. The solution was then shaken with 1N sodium bisulfite to remove bromine. The organic solution was evaporated to dryness and the orange solid was purified by sublimation (150° C., 0.05 mm Hg), recrystallization (acetone) and column chromatography (toluene, $SiO_2$) to afford an off-white solid (3.5 grams, 8%). The dimethyl 4-bromo-2,6-naphthalene dicarboxylate was determined to be pure by gas chromatography with a melting point of 183°–184° C. A molecular weight of 323 was confirmed by Field Desorption Mass Spectroscopy (FDMS).

Many variations will suggest themselves to those skilled in this art in light of the above detailed description. All such obvious modifications are within the full intended scope of the appended claims.

What is claimed is:

1. A poly(ethylene 2,6-naphthalene dicarboxylate) composition with reduced fluorescence consisting essentially of repeat units from:
   (a) a dicarboxylic acid component which comprises at least 85 mole percent of a dicarboxylic acid selected from the group consisting of naphthalene-2,6-dicarboxylic acid, and naphthalene-2,6-dicarboxylate ester;
   (b) a diol component which comprises at least 85 mole percent of ethylene glycol; and
   (c) 0.5 to 2 mole percent, based on 100 mole percent dicarboxylic acid and 100 mole percent diol, of a difunctional halogen containing aromatic compound which has at least one halogen group directly attached to the aromatic ring.

2. The composition of claim 1 wherein the disfunctional halogen containing aromatic compound has an aromatic ring selected from the group consisting of benzene, naphthalene and biphenyl.

3. The composition of claim 2 wherein the aromatic ring contains at least two polymerizable groups selected from the group consisting of carboxylic esters, aliphatic hydroxyl groups and combinations thereof.

4. The composition of claim 3 wherein the carboxylic ester has the formula:

wherein $R_3$ is a $C_1$ to $C_6$ alkyl or phenyl group.

5. The composition of claim 4 wherein the carboxylic ester is

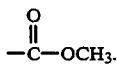

6. The composition of claim 3 wherein the aliphatic hydroxyl group has the formula:

wherein n is an integer from 1 to 6.

7. The composition of claim 5 wherein the aliphatic hydroxyl group is (CH$_2$)$_2$OH.

8. The composition of claim 3 wherein the aromatic ring compound is selected from the group consisting of terephthalic acid, isophthalic acid, 2,6-naphthalenedicarboxylic acid and the ester derivatives thereof.

9. The composition of claim 8 wherein the aromatic ring compound is 2,6-naphthalenedicarboxylic acid or ester.

10. The composition of claim 2 wherein the aromatic ring contains at least one halogen atom selected from the group consisting of bromine, iodine, chlorine, and combinations thereof, provided that chlorine is not the only halogen atom on the aromatic ring.

11. The composition of claim 1 wherein the disfunctional halogen containing aromatic compound is selected from the group consisting of dimethyl iodoterephthalate, dimethyl 4-bromo-2,6-naphthalenedicarboxylate, dimethyl 1-bromo 2,6-naphthalenedicarboxylate, dimethyl 3-bromo 2,6-naphthalenedicarboxylate, dimethyl 1-iodo 2,6-naphthalenedicarboxylate, dimethyl 3-iodo 2,6-naphthalenedicarboxylate, dimethyl 4-iodo 2,6-naphthalenedicarboxylate, dimethyl 2,3-dibromoterephthalate, dimethyl 2,5-dibromoterephthalate, dimethyl tribromoterephthalate, dimethyl tetrabromoterephthalate, dimethyl 2-bromo-5-chloroterephthalate, dimethyl 2-bromo-6-chloroterephthalate, dimethyl 2-bromo-5-iodoterephthalate, dimethyl 2-bromo-6-iodoterephthalate, dimethyl 2-benzoyl-5-bromoterephthalate, dimethyl 2-benzoyl-6-bromoterephthalate, dimethyl 2-benzoyl-5-iodoterephthalate, and dimethyl 2-benzoyl-6-iodoterephthalate.

12. The composition of claim 11 wherein the disfunctional halogen containing aromatic compound is dimethyl 4-bromo-2,6-naphthalene dicarboxylate.

13. The composition of claim 12 wherein the disfunctional halogen containing aromatic compound is dimethyl iodoterephthalate.

* * * * *